US009824410B1

(12) United States Patent
Sendelbach et al.

(10) Patent No.: US 9,824,410 B1
(45) Date of Patent: Nov. 21, 2017

(54) SYSTEM, METHOD AND APPARATUS FOR ASSESSING THE ACCURACY OF ESTIMATED FOOD DELIVERY TIME

(71) Applicant: GrubHub Holdings Inc., Chicago, IL (US)

(72) Inventors: Jason Sendelbach, Chicago, IL (US); Michael Evans, Chicago, IL (US); Peter Aarested, Chicago, IL (US); Olga Dimitrijevic, Chicago, IL (US); Lee Baker, Chicago, IL (US); Rhiannon Zivin, Chicago, IL (US); Kurt Peterson, Chicago, IL (US); Josh Evnin, Chicago, IL (US); Jonathan Treble, Chicago, IL (US); Lam Doan, Chicago, IL (US); Lillie C. de Merode, Chicago, IL (US); Matthew Maloney, Chicago, IL (US)

(73) Assignee: GrubHub Holdings Inc., Chicago, IL (US)

( * ) Notice: Subject to any disclaimer, the term of this patent is extended or adjusted under 35 U.S.C. 154(b) by 643 days.

(21) Appl. No.: 14/263,506

(22) Filed: Apr. 28, 2014

Related U.S. Application Data

(60) Provisional application No. 61/817,070, filed on Apr. 29, 2013.

(51) Int. Cl.
*G06Q 10/00* (2012.01)
*G06Q 30/00* (2012.01)
(Continued)

(52) U.S. Cl.
CPC ....... *G06Q 50/12* (2013.01); *G06Q 10/06312* (2013.01); *G06Q 10/06393* (2013.01)

(58) Field of Classification Search
CPC ....... G06Q 10/06313; G06Q 10/63293; G06Q 50/12
(Continued)

(56) References Cited

U.S. PATENT DOCUMENTS 4,530,067 A   7/1985   Dorr
4,547,851 A   10/1985  Kurland
(Continued)

FOREIGN PATENT DOCUMENTS

EP   0 844 579 A2   5/1998
EP   0 856 812 A2   5/1998
(Continued)

OTHER PUBLICATIONS

About Us, Compuwave Technologies Inc., Feb. 7, 2001.
(Continued)

*Primary Examiner* — Sujay Koneru
(74) *Attorney, Agent, or Firm* — Hickman Palermo Becker Bingham LLP

(57) ABSTRACT

A restaurant service system for assessing the accuracy of estimated delivery time provided by a restaurant includes an order server, a restaurant server, a service server and an assessment server. Each of the servers includes a server software application. The order server software application collects a set of orders from a set of diner devices. The restaurant server software application retrieves an estimated delivery time for each order in the set. The service server software application determines an order actual delivery time for at least one order in the set. The assessment server software application determines an accuracy measure of estimated delivery time for the restaurant.

4 Claims, 11 Drawing Sheets

(51) Int. Cl.
*G06Q 50/00* (2012.01)
*G06Q 50/12* (2012.01)
*G06Q 10/06* (2012.01)

(58) Field of Classification Search
USPC .......................................... 705/7.22, 7.39, 15
See application file for complete search history.

(56) References Cited

U.S. PATENT DOCUMENTS

| | | | |
|---|---|---|---|
| 5,189,411 A | 2/1993 | Collar | |
| 5,272,474 A | 12/1993 | Hilliard | |
| 5,367,557 A | 11/1994 | Ozenbaugh | |
| 5,510,979 A | 4/1996 | Moderi | |
| 5,570,283 A | 10/1996 | Shoolery | |
| 5,745,681 A | 4/1998 | Levine | |
| 5,751,958 A | 5/1998 | Zweben | |
| 5,774,670 A | 6/1998 | Montulli | |
| 5,781,189 A | 7/1998 | Holleran | |
| 5,835,896 A | 11/1998 | Fisher | |
| 5,838,798 A | 11/1998 | Stevens | |
| 5,839,115 A | 11/1998 | Coleman | |
| 5,842,176 A | 11/1998 | Hunt | |
| 5,845,263 A | 12/1998 | Camaisa | |
| 5,850,214 A | 12/1998 | McNally | |
| 5,912,743 A | 6/1999 | Kinebuchi | |
| 5,948,040 A | 9/1999 | DeLorme | |
| 5,966,068 A | 10/1999 | Wicks | |
| 5,970,474 A | 10/1999 | LeRoy | |
| 5,991,739 A | 11/1999 | Cupps et al. | |
| 6,134,548 A | 10/2000 | Gottsman | |
| 6,167,255 A | 12/2000 | Kennedy | |
| 6,175,922 B1 | 1/2001 | Wang | |
| 6,208,976 B1 | 3/2001 | Kinebuchi | |
| 6,236,974 B1 | 5/2001 | Kolawa | |
| 6,282,491 B1 | 8/2001 | Bochmann | |
| 6,295,541 B1 | 9/2001 | Bodnar | |
| 6,300,947 B1 | 10/2001 | Kanevsky | |
| 6,341,268 B2 | 1/2002 | Walker | |
| 6,356,543 B2 | 3/2002 | Hall | |
| 6,366,650 B1 | 4/2002 | Rhie | |
| 6,384,850 B1 | 5/2002 | McNally et al. | |
| 6,415,138 B2 | 7/2002 | Sirola | |
| 6,590,588 B2 | 7/2003 | Lincke | |
| 6,594,347 B1 | 7/2003 | Calder | |
| 6,836,537 B1 | 12/2004 | Zirngibl | |
| 6,871,325 B1 | 3/2005 | McNally et al. | |
| 6,873,693 B1 | 3/2005 | Langseth | |
| 6,973,437 B1 | 12/2005 | Olewicz | |
| 6,976,004 B2 | 12/2005 | Wittrup | |
| 6,982,733 B1 | 1/2006 | McNally et al. | |
| 7,069,228 B1 | 6/2006 | Rose | |
| 7,216,152 B2 | 5/2007 | Short | |
| 7,277,717 B1 | 10/2007 | Hart | |
| 7,295,920 B2 | 11/2007 | Finkelstein | |
| 7,359,871 B1 | 4/2008 | Paasche | |
| 7,386,477 B2 | 6/2008 | Fano | |
| 7,437,305 B1 | 10/2008 | Kantarjiev | |
| 7,966,215 B1 | 6/2011 | Myers | |
| 8,010,404 B1* | 8/2011 | Wu ........................ G06Q 30/02 705/1.1 |
| 8,073,723 B1 | 12/2011 | Bilibin et al. | |
| 8,146,077 B2 | 3/2012 | McNally et al. | |
| 8,326,705 B2 | 12/2012 | Niessen et al. | |
| 8,341,003 B1 | 12/2012 | Bilibin et al. | |
| 2001/0047301 A1 | 11/2001 | Walker | |
| 2002/0005430 A1 | 1/2002 | Pentel | |
| 2002/0046093 A1 | 4/2002 | Miller | |
| 2002/0107747 A1 | 8/2002 | Gerogianni | |
| 2002/0143655 A1 | 10/2002 | Elston | |
| 2002/0161604 A1 | 10/2002 | Kardos | |
| 2002/0178034 A1 | 11/2002 | Gardner | |
| 2003/0125963 A1 | 7/2003 | Haken | |
| 2005/0004843 A1 | 1/2005 | Heflin | |
| 2005/0049940 A1 | 3/2005 | Tengler | |
| 2006/0010037 A1* | 1/2006 | Angert ................ G06Q 10/087 705/15 |
| 2006/0020497 A1 | 1/2006 | McNally | |
| 2006/0069578 A1 | 3/2006 | Borkowski | |
| 2006/0080176 A1 | 4/2006 | Sutcliffe | |
| 2007/0011061 A1 | 1/2007 | East | |
| 2007/0150375 A1 | 6/2007 | Yang | |
| 2007/0294129 A1 | 12/2007 | Froseth et al. | |
| 2008/0076451 A1 | 3/2008 | Sheha et al. | |
| 2008/0104059 A1 | 5/2008 | Segel | |
| 2008/0319864 A1 | 12/2008 | Leet | |
| 2009/0048890 A1* | 2/2009 | Burgh .................... G06Q 10/04 705/7.15 |
| 2009/0099972 A1 | 4/2009 | Angert | |
| 2009/0106124 A1 | 4/2009 | Yang | |
| 2009/0150193 A1 | 6/2009 | Hong | |
| 2009/0167553 A1 | 7/2009 | Hong | |
| 2009/0204492 A1 | 8/2009 | Scifo et al. | |
| 2009/0307096 A1 | 12/2009 | Antonellis | |
| 2009/0319166 A1 | 12/2009 | Khosravy | |
| 2010/0070376 A1 | 3/2010 | Proud et al. | |
| 2010/0223551 A1 | 9/2010 | Twig | |
| 2010/0250384 A1 | 9/2010 | Bhargava | |
| 2010/0268620 A1 | 10/2010 | Angert | |
| 2011/0040642 A1 | 2/2011 | O'Dell | |
| 2011/0161137 A1 | 6/2011 | Ubalde | |
| 2011/0191194 A1 | 8/2011 | Lutnick et al. | |
| 2011/0208617 A1 | 8/2011 | Weiland | |
| 2011/0218839 A1 | 9/2011 | Shamaiengar | |
| 2011/0258011 A1* | 10/2011 | Burns ................ G06Q 10/06 705/7.15 |
| 2012/0203619 A1 | 8/2012 | Lutnick et al. | |
| 2012/0290413 A1 | 11/2012 | Harman | |
| 2013/0038800 A1 | 2/2013 | Yoo | |
| 2013/0103605 A1 | 4/2013 | Villegas | |
| 2013/0144730 A1 | 6/2013 | Harman | |
| 2013/0144764 A1 | 6/2013 | Walling, III | |

FOREIGN PATENT DOCUMENTS

| | | |
|---|---|---|
| EP | 1 081 625 A2 | 7/2001 |
| JP | 62-050919 | 3/1987 |
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 A1 | 12/1995 |
| WO | WO 97/08635 A1 | 3/1997 |
| WO | WO 98/35311 A1 | 8/1998 |
| WO | WO 99/17236 A1 | 4/1999 |
| WO | 0171617 | 9/2001 |

OTHER PUBLICATIONS

Wireless Products, Compuwave Technologies Inc., Feb. 7, 2001.
Micros Systems, Inc., POS Configurator User's Guide, 3700 POS, Micros Systems, Inc., 1998.
Micros Systems, Inc., New Products, Micros Systems, Inc., Nov. 11, 1996.
Rita Marie Emmer, Marketing Hotels: Using Global Distribution System, Cornell Hotel and Restaurant Administration Quarterly, 1993, 34; 80, DOI: 10.1177/001088049303400614.
T. Imielinski, Adaptive Wireless Information Systems, 1994.
IBM, POS Computer, 1998.
Krishna Bharat, Migratory Applications, Andrew Fano, Shopper's Eye: Using Lcoation-based filtering for a shopping agent in the physical world, 1998.
Len Lewis, Opening the gates, Progressive Grover, Jul. 1998.

(56) References Cited

OTHER PUBLICATIONS

Arthur Keller, The DIANA approach to mobile computing, CiteSeer, 1995.
A Chavez, A real-life experiment in creating an agent marketplace, PAAM, 1997.
Richard De Santa, Are you into your customers?, Supermarket Business, Jan. 1997.
Barron Housel, WebExpress: a system for optimizing web browsing in a wireless environment.
Carrie Lehman, Service connects restaurants, customers via orders by Internet, Alaska Journal of Commerce, Apr. 28, 1997.
Jennifer Rowley, Internet food retailing: the UK in context, ProQuest LLC, 1998.
John Soeder, Cyber Solicitation, Restaurant Hospitality, Sep. 1997.
Brew Moon Management Toasts SQUiRREL's "Seamless Solution", SQUIRREL Systems, Nov. 1998.
Squirrel Systems, Squirrel® Customer Profile: Chevys Fresh Mex®, Squirrel Systems—Restaurant Management, Aug. 1998.
Micro Systems, Inc., Appendix, User's Manual, 8700 HMS Version 2.10, micros Systems, Inc., 1995-1997.
Micro Systems, Inc., Chapter 1-11, User's Manual, 8700 HMS Version 2.10, micros Systems, Inc., 1995-1997.
Micro Systems, Inc., Full Service Operations, Micros 3700 Point-of-Sale System, Micro Systems, Inc., Nov. 11, 1996.
Micro Systems, Inc., New Products, Micros 3700 Point-of-Sale System, Micro Systems, Inc., Nov. 11, 1996.
Micro Systems, Inc., Quick Service Operations, Micro Systems, Inc., Nov. 11, 1996.
Micro Systems, Inc., All About Us, Micro Systems, Inc., Nov. 11, 1996.
Micro Systems, Inc., Full Service Operations, Micro Systems, Inc., Nov. 11, 1996.
Micro Systems, Inc., 8700 HMS Product Overview, Micro Systems, Inc., 2000.
Micro Systems, Inc., Micros Hand-Held TouchScreen, Micro Systems, Inc., Sep. 1992.
Micro Systems, Inc., The Micro 2700 HMS Touchscreen, Micro Systems, Inc.
RMS Touch, RMS-Touch—Touch Screen Restaurant Management System Product Description, RMSTouch.com, Feb. 15, 1997.
RMS Touch, Company Profile RMS, Touch.com, Integrated Restaurant Software, Feb. 15, 1997.
Elite32 Restaurant System, Compuwave Technologies Inc., 2000.
POS Infrared Restaurant System, Compuwave Technologies Inc., 2000.
Wireless POS Drive-Through System, Compuwave Technologies Inc., 2000.
Compuware Technologies Approved as Supplier to McDonald's Canda, Compuwave Technologies Inc., Sep. 14, 2000.
Kevin Crowston, Understanding Processes in Organizations, Jul. 1998.
Engaging Customers Across All Touch Points: A Roadmap for Leading Retailers, Blue Martini Software, Inc., www.bluemartini.com.
Chuck Andraka, Put your database on the Web, Data Based Advisor, v14, n6, p. 12, Jun. 1996.
Steven Vaughan-Nichols, Unleashing Databases on the Web—True wealth and power belong to those who control information access, Netguide, 1996, n307, p. 111.
P.L. Olympia, Cold Fusion 1.5; Autobahn, DBMS, v9, n8, p. 33, Jul. 1996.
eshop.com, eShop Technology, eshop.com, Jan. 1, 1996.
eshop.com, eShip Technology Merchant Manual, eShop.com, Feb. 21, 1996.
Kambe Tomonari, Screen design simulator "U-face", Information Processing Society of Japan (IPSJ) The 39th National convention colleciton of papers, 1457-1458, Oct. 16, 1989.
Kato Kiyosh, A Prototype of a User Interface Software for Portable Terminal with a Small Display Screen, Information Processing Society of Japan (IPSJ) The 53rd National co. . . .
Squirrel Systems, May 8, 1999, http://web.archive.org/web/19990508153731/www.squirrelsystems.com/about/company.
Robin Berger, POS Positions Spago for Growth, Squirrel Systems, Apr./May 1997.
Squirrel Systems, POS System, May 8, 1999, http://web.archive.org/web/19990508175824/www.squirrelsystems.com/products/newsq . . . .
Squirrel Systems, Squirrel Restaurant Management System.
Squirrel Systems, Press Releases, Squirrel Systems, Aug. 20, 1998.
Business Editors, Fujitsu and Sulcus Hospitality Group partner to develop first wireless computer for restaurant industry, Business Wire, Aug. 30, 1993.
Sulcus's Squirrel and cybermeals Ink Technology Alliance, Business Wire, Feb. 24, 1998.
Accel Partners Invest $10 Million incybermeals, Business Wire, May 28, 1998.
Rev Share Information, Cybermeals, Jan. 24, 1998.
Squirrel point-of-sale software, Squirrel Systems, Oct. 10, 1999.
Chapter 4—Wireless Data, Wireless Technologies and the National Information Infrastructure, Diane Pub Co, Oct. 1995.
U.S. Appl. No. 60/131,119, filed Apr. 27, 1999, Robert Showghi.
U.S. Appl. No. 60/083,651, filed Apr. 30, 1998, Theodore Chen.
Wireless Restaurant System, Compuwave Technologies Inc., Feb. 7, 2001.

\* cited by examiner

| 1 - 35 | 36 - 70 | 71 - 105 | 106 - 140 | 141 - 170 |
|---:|---:|---:|---:|---:|
| -43 | -6 | -2 | 0 | 4 |
| -43 | -6 | -2 | 0 | 5 |
| -39 | -6 | -2 | 0 | 5 |
| -36 | -6 | -2 | 0 | 5 |
| -36 | -6 | -2 | 1 | 5 |
| -33 | -6 | -2 | 1 | 5 |
| -33 | -6 | -2 | 1 | 5 |
| -32 | -6 | -1 | 2 | 5 |
| -32 | -6 | -1 | 2 | 5 |
| -28 | -6 | -1 | 2 | 6 |
| -27 | -6 | -1 | 2 | 6 |
| -23 | -5 | -1 | 2 | 6 |
| -23 | -5 | 0 | 2 | 6 |
| -22 | -5 | 0 | 2 | 6 |
| -22 | -5 | 0 | 2 | 6 |
| -19 | -5 | 0 | 2 | 6 |
| -14 | -5 | 0 | 2 | 6 |
| -14 | -4 | 0 | 3 | 7 |
| -13 | -4 | 0 | 3 | 7 |
| -12 | -4 | 0 | 3 | 7 |
| -12 | -4 | 0 | 3 | 7 |
| -12 | -4 | 0 | 3 | 7 |
| -11 | -4 | 0 | 3 | 7 |
| -10 | -4 | 0 | 3 | 8 |
| -10 | -4 | 0 | 3 | 9 |
| -9 | -3 | 0 | 4 | 9 |
| -8 | -3 | 0 | 4 | 9 |
| -8 | -3 | 0 | 4 | 9 |
| -8 | -3 | 0 | 4 | 10 |
| -7 | -3 | 0 | 4 | 10 |
| -7 | -3 | 0 | 4 | |
| -7 | -3 | 0 | 4 | |
| -7 | -3 | 0 | 4 | |
| -7 | -2 | 0 | 4 | |
| -7 | -2 | 0 | 4 | |

|     | 0      | 0.01   | 0.02   | 0.03   | 0.04   | 0.05   | 0.06   | 0.07   | 0.08   | 0.09   |
|-----|--------|--------|--------|--------|--------|--------|--------|--------|--------|--------|
| 0   | 0.5000 | 0.5040 | 0.5080 | 0.5120 | 0.5160 | 0.5199 | 0.5239 | 0.5279 | 0.5319 | 0.5359 |
| 0.1 | 0.5398 | 0.5438 | 0.5478 | 0.5517 | 0.5557 | 0.5596 | 0.5636 | 0.5675 | 0.5714 | 0.5753 |
| 0.2 | 0.5793 | 0.5832 | 0.5871 | 0.5910 | 0.5948 | 0.5987 | 0.6026 | 0.6064 | 0.6103 | 0.6141 |
| 0.3 | 0.6179 | 0.6217 | 0.6255 | 0.6293 | 0.6331 | 0.6368 | 0.6406 | 0.6443 | 0.6480 | 0.6517 |
| 0.4 | 0.6554 | 0.6591 | 0.6628 | 0.6664 | 0.6700 | 0.6736 | 0.6772 | 0.6808 | 0.6844 | 0.6879 |
| 0.5 | 0.6915 | 0.6950 | 0.6985 | 0.7019 | 0.7054 | 0.7088 | 0.7123 | 0.7157 | 0.7190 | 0.7224 |
| 0.6 | 0.7257 | 0.7291 | 0.7324 | 0.7357 | 0.7389 | 0.7422 | 0.7454 | 0.7486 | 0.7517 | 0.7549 |
| 0.7 | 0.7580 | 0.7611 | 0.7642 | 0.7673 | 0.7704 | 0.7734 | 0.7764 | 0.7794 | 0.7823 | 0.7852 |
| 0.8 | 0.7881 | 0.7910 | 0.7939 | 0.7967 | 0.7995 | 0.8023 | 0.8051 | 0.8078 | 0.8106 | 0.8133 |
| 0.9 | 0.8159 | 0.8186 | 0.8212 | 0.8238 | 0.8264 | 0.8289 | 0.8315 | 0.8340 | 0.8365 | 0.8389 |
| 1.0 | 0.8413 | 0.8438 | 0.8461 | 0.8485 | 0.8508 | 0.8531 | 0.8554 | 0.8577 | 0.8599 | 0.8621 |
| 1.1 | 0.8643 | 0.8665 | 0.8686 | 0.8708 | 0.8729 | 0.8749 | 0.8770 | 0.8790 | 0.8810 | 0.8830 |
| 1.2 | 0.8849 | 0.8869 | 0.8888 | 0.8907 | 0.8925 | 0.8944 | 0.8962 | 0.8980 | 0.8997 | 0.9015 |
| 1.3 | 0.9032 | 0.9049 | 0.9066 | 0.9082 | 0.9099 | 0.9115 | 0.9131 | 0.9147 | 0.9162 | 0.9177 |
| 1.4 | 0.9192 | 0.9207 | 0.9222 | 0.9236 | 0.9251 | 0.9265 | 0.9279 | 0.9292 | 0.9306 | 0.9319 |
| 1.5 | 0.9332 | 0.9345 | 0.9357 | 0.9370 | 0.9382 | 0.9394 | 0.9406 | 0.9418 | 0.9429 | 0.9441 |
| 1.6 | 0.9452 | 0.9463 | 0.9474 | 0.9484 | 0.9495 | 0.9505 | 0.9515 | 0.9525 | 0.9535 | 0.9545 |
| 1.7 | 0.9554 | 0.9564 | 0.9573 | 0.9582 | 0.9591 | 0.9599 | 0.9608 | 0.9616 | 0.9625 | 0.9633 |
| 1.8 | 0.9641 | 0.9649 | 0.9656 | 0.9664 | 0.9671 | 0.9678 | 0.9686 | 0.9693 | 0.9699 | 0.9706 |
| 1.9 | 0.9713 | 0.9719 | 0.9726 | 0.9732 | 0.9738 | 0.9744 | 0.9750 | 0.9756 | 0.9761 | 0.9767 |
| 2.0 | 0.9772 | 0.9778 | 0.9783 | 0.9788 | 0.9793 | 0.9798 | 0.9803 | 0.9808 | 0.9812 | 0.9817 |
| 2.1 | 0.9821 | 0.9826 | 0.9830 | 0.9834 | 0.9838 | 0.9842 | 0.9846 | 0.9850 | 0.9854 | 0.9857 |
| 2.2 | 0.9861 | 0.9864 | 0.9868 | 0.9871 | 0.9875 | 0.9878 | 0.9881 | 0.9884 | 0.9887 | 0.9890 |
| 2.3 | 0.9893 | 0.9896 | 0.9898 | 0.9901 | 0.9904 | 0.9906 | 0.9909 | 0.9911 | 0.9913 | 0.9916 |
| 2.4 | 0.9918 | 0.9920 | 0.9922 | 0.9925 | 0.9927 | 0.9929 | 0.9931 | 0.9932 | 0.9934 | 0.9936 |
| 2.5 | 0.9938 | 0.9940 | 0.9941 | 0.9943 | 0.9945 | 0.9946 | 0.9948 | 0.9949 | 0.9951 | 0.9952 |
| 2.6 | 0.9953 | 0.9955 | 0.9956 | 0.9957 | 0.9959 | 0.9960 | 0.9961 | 0.9962 | 0.9963 | 0.9964 |
| 2.7 | 0.9965 | 0.9966 | 0.9967 | 0.9968 | 0.9969 | 0.9970 | 0.9971 | 0.9972 | 0.9973 | 0.9974 |
| 2.8 | 0.9974 | 0.9975 | 0.9976 | 0.9977 | 0.9977 | 0.9978 | 0.9979 | 0.9979 | 0.9980 | 0.9981 |
| 2.9 | 0.9981 | 0.9982 | 0.9982 | 0.9983 | 0.9984 | 0.9984 | 0.9985 | 0.9985 | 0.9986 | 0.9986 |
| 3.0 | 0.9987 | 0.9987 | 0.9987 | 0.9988 | 0.9988 | 0.9989 | 0.9989 | 0.9989 | 0.9990 | 0.9990 |
| 3.1 | 0.9990 | 0.9991 | 0.9991 | 0.9991 | 0.9992 | 0.9992 | 0.9992 | 0.9992 | 0.9993 | 0.9993 |
| 3.2 | 0.9993 | 0.9993 | 0.9994 | 0.9994 | 0.9994 | 0.9994 | 0.9994 | 0.9995 | 0.9995 | 0.9995 |
| 3.3 | 0.9995 | 0.9995 | 0.9995 | 0.9996 | 0.9996 | 0.9996 | 0.9996 | 0.9996 | 0.9996 | 0.9997 |
| 3.4 | 0.9997 | 0.9997 | 0.9997 | 0.9997 | 0.9997 | 0.9997 | 0.9997 | 0.9997 | 0.9997 | 0.9998 |

FIG. 8

| | |
|---|---|
| Order ID | — 1002 |
| Diner name | — 1004 |
| Diner address | — 1006 |
| Diner telephone number | — 1008 |
| Diner email address | — 1010 |
| Order instruction | — 1012 |
| Order item ID | — 1016 |
| Order item quantity | — 1018 |
| Order item instruction | — 1020 |
| Order item unit price | — 1022 |
| . . . | — 1024 |
| Order total price | — 1026 |
| Order status | — 1028 |
| Order time | — 1030 |
| Order confirmation time | — 1032 |
| Order estimated delivery time | — 1034 |
| Order out-for-delivery time | — 1036 |
| Restaurant ID | — 1038 |
| Order actual delivery time | — 1040 |
| . . . | |

SYSTEM, METHOD AND APPARATUS FOR ASSESSING THE ACCURACY OF ESTIMATED FOOD DELIVERY TIME

CROSS REFERENCE TO RELATED APPLICATIONS

This application claims the benefit and priority of U.S. Patent Application No. 61/817,070, entitled "SYSTEM, METHOD AND APPARATUS FOR ASSESSING THE ACCURACY OF ESTIMATED FOOD DELIVERY TIME," filed Apr. 29, 2013, assigned to GrubHub, Inc. of Chicago, Ill., and which is hereby incorporated by reference in its entirety. This application is related to a U.S. patent application Ser. No. 13/612,243, entitled "METHOD AND APPARATUS FOR MANAGING ORDERS FOR A REAL TIME INTEGRATED RESTAURANT SERVICE," filed Sep. 12, 2012, assigned to GrubHub, Inc. of Chicago, Ill., which is hereby incorporated by reference. This application is also related to a U.S. patent application Ser. No. 13/622,659, entitled "SYSTEM, METHOD AND APPARATUS FOR MANAGING THE DELIVERY OF MADE-TO-ORDER FOOD," filed Sep. 19, 2012, assigned to GrubHub, Inc. of Chicago, Ill., which is hereby incorporated by reference. This application is further related to a U.S. patent application Ser. No. 13/622,837, entitled "SYSTEM, METHOD AND APPARATUS FOR RECEIVING BIDS FROM DINERS FOR EXPEDITED FOOD DELIVERY," filed Sep. 19, 2012, assigned to GrubHub, Inc. of Chicago, Ill., which is hereby incorporated by reference. Moreover, this application is related to a U.S. patent application Ser. No. 13/622,868, entitled "SYSTEM, METHOD AND APPARATUS FOR MANAGING INCENTIVE BASED DELIVERY OF MADE-TO-ORDER FOOD UTILIZING A NETWORK OF INDEPENDENT DRIVERS," filed Sep. 19, 2012, assigned to GrubHub, Inc. of Chicago, Ill., which is hereby incorporated by reference.

FIELD OF THE DISCLOSURE

The present invention relates to a system, method and apparatus for providing a restaurant service, and more particularly relates to a system, method and apparatus for assessing the accuracy of estimated food delivery time provided by restaurants within the restaurant service.

DESCRIPTION OF BACKGROUND

Internet has made restaurant shopping services feasible, as diners can be given a selection of restaurants within a specified distance of their location. Food can then be delivered to them, or diners can go to the restaurant to pick up their order. Additionally, availability of Global Positioning System ("GPS") receivers on mobile phones allows diners to locate restaurants near their physical locations and place orders from these restaurants through a restaurant service system. The placed orders are then communicated to respective serving restaurants, which will subsequently confirm reception of the orders. The serving restaurants may provide additional information, such as estimated delivery time of each order, pertaining to the orders they are serving. Such information may further be communicated to diners.

When the orders are prepared and ready for delivery, delivery drivers pick up the orders from the restaurants, and deliver them to respective diners. To keep diners apprised of the status of their orders, various statuses pertaining to their orders are provided to the diners. Order statuses include, for example, unconfirmed by a restaurant, confirmed by the restaurant, ready-for-delivery, being delivered, five minutes from the diner's place, six minutes before or after estimated delivery time, etc. Due to various factors, the estimated delivery time for an order may not be accurate. For example, some restaurants are not skilled at accurately estimating their delivery time, or equipped with sufficient technologies for accurate estimation. As an additional example, some delivery drivers working for or associated with certain restaurants are not effective drivers. As still a further example, during busy time periods (such as 6-8 PM on Fridays) or in inclement weather, estimated delivery time can be less accurate.

Since the most important goal for a restaurant service is to provide a high quality service, information about the accuracy of estimated delivery time for an order can be helpful in numerous ways. For example, an assessment of the accuracy of estimated delivery time provided by restaurants can be provided to diners in assisting their selection of restaurants or for informational purpose. As an additional example, the assessment can help to rank or rate the restaurants participating the restaurant service.

Accordingly, there exists a need for assessing the accuracy of estimated delivery time provided by restaurants within a restaurant service

OBJECTS OF THE DISCLOSED SYSTEM, METHOD, AND APPARATUS

An object of the disclosed restaurant service system is to determine the actual delivery time of a delivery order;

An object of the disclosed restaurant service system is to determine the actual delivery time of a delivery order by sending a SMS message to the diner;

An object of the disclosed restaurant service system is to determine the actual delivery time of a delivery order based on the delivery driver's GPS locations;

An object of the disclosed restaurant service system is to analyze the historical orders' estimated delivery time and actual delivery time of a restaurant to derive a set of statistical measures;

An object of the disclosed restaurant service system is to assess the accuracy of estimated delivery time based on statistical measures for a restaurant;

An object of the disclosed restaurant service system is to rank restaurants based on their accuracy of their estimated delivery time;

An object of the disclosed restaurant service system is to provide a message to a diner regarding a restaurant's accuracy of its estimated delivery time;

Other advantages of this disclosure will be clear to a person of ordinary skill in the art. It should be understood, however, that a system, method, or apparatus could practice the disclosure while not achieving all of the enumerated advantages, and that the protected disclosure is defined by the claims.

SUMMARY OF THE DISCLOSURE

Generally speaking, pursuant to the various embodiments, the present disclosure provides a restaurant service system for assessing the accuracy of estimated delivery time provided by a restaurant. The system includes an order server, a restaurant server, a service server and an assessment server. Each of the servers includes a server software application. The order server software application collects a set of orders from a set of diner devices. The restaurant server software application retrieves an estimated delivery time for each order in the set. The service server software application determines an order actual delivery time for at least one order in the set. The assessment server software application determines an accuracy measure of estimated delivery time for the restaurant.

Further in accordance with the present teachings is an assessment server within a restaurant service for assessing the accuracy of estimated delivery time of orders provided by a restaurant. The assessment server includes a processor and software application adapted to operate on the processor. The software is further adapted to retrieve an estimated delivery time and an order actual delivery time for each order in a set of orders from a database. The software is also adapted to compute a set of delivery time variations from the set of estimated delivery time and the set of order actual delivery time, and derive a set of statistical measures from the set of delivery time variations. The software is further adapted to generate an accuracy measure of estimated delivery time for the restaurant, and store the set of statistical measures and the accuracy measure into the database.

Further in accordance with the present teachings is a method, performed by a restaurant service system, for assessing the accuracy of estimated delivery time provided by a restaurant within the restaurant service. The method includes receiving a set of orders from a set of diner devices, and sending the set of orders to an on-site service appliance disposed within the restaurant. The method also includes receiving an estimated delivery time for each order in the set of orders from the on-site service appliance, and determining an order actual delivery time for at least one order in the set of orders. Moreover, the method includes determining an accuracy measure of estimated delivery time for the restaurant and storing the accuracy measure of estimated delivery time for the restaurant into the database.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 6 is a sample table of delivery time variations in accordance with the teachings of this disclosure;

FIG. 8 is a table of cumulative probabilities for a standard normal distribution in accordance with the teachings of this disclosure;

FIG. 10 is a sample order data structure in accordance with the teachings of this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION OF THE ILLUSTRATED EMBODIMENT

Figure 1:
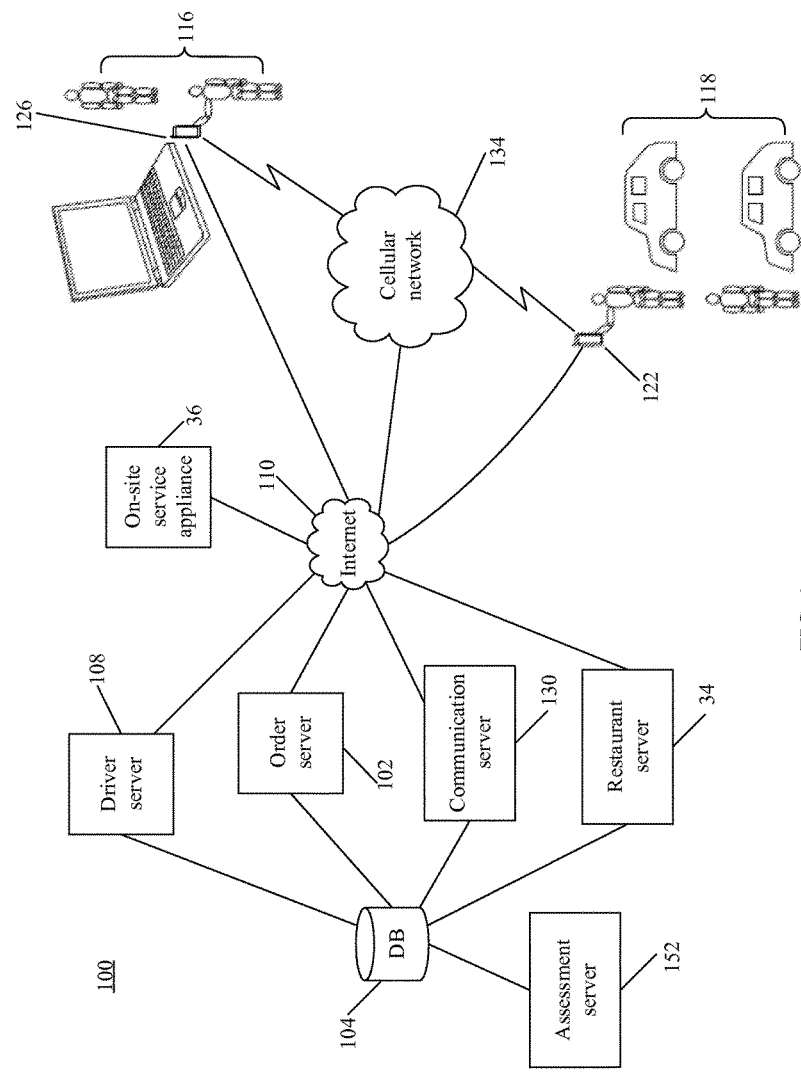
FIG. 1 is a simplified block diagram of a restaurant service system constructed in accordance with this disclosure.

Turning to the Figures and to FIG. 1 in particular, a restaurant service system 100 that provides assessment of the accuracy of estimated delivery time is shown. The illustrated system 100 provides for real time information exchange between a restaurant server 34, a database 104 (such as an Oracle database or Microsoft SQL database), a restaurant on-site service appliance ("OSA") 36, an order server 102, a driver server 108, a communication server 130, an assessment server 152, diners 116 using diner devices 126, and delivery drivers 118 using driver mobile devices 122. Both the driver server 108 and the communication server 130 are service servers. In one implementation, each of the servers 102,108,130,34,152 includes a processor, a network interface, and some amount of memory.

Figure 11:
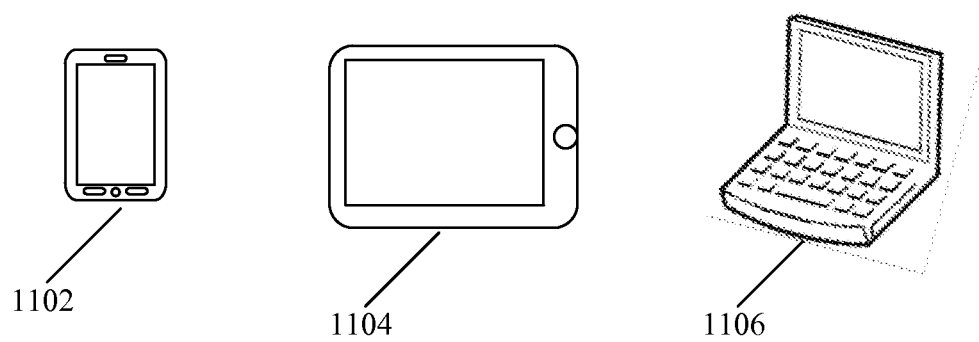
FIG. 11 is a perspective view of mobile devices in accordance with the teachings of this disclosure.

Each of the diner devices 126 and the driver devices 122 can be one of the devices pictured in FIG. 11. Each of the devices in FIG. 11 includes a housing, a processor, a networking interface, a display screen, some amount of memory (such as 8 GB RAM), and some amount of storage. In one implementation, the diner devices 126 and the driver devices 122 are smart mobile phones, such as iPhone devices created by Apple, Inc., with touchscreens. Alternatively, the diner devices 126 and the driver devices 122 are tablet computers, such as iPad devices created by Apple, Inc.

As depicted, diners 116 access the restaurant service using, for example, the world wide web or a smartphone, coupled to the Internet 110 or a cellular network 134. The order server 102 interfaces with diners 116, and other diners, using the Internet 110 or another wide area network, and, in response to the diners' inputs, creates, modifies, or cancels orders in the database 104. The orders are queued in the database 104, which also includes information regarding diners as well as restaurant menus, as more fully set forth in U.S. application Ser. No. 13/612,243, which is previously incorporated by reference.

The restaurant server 34, which is also coupled to the Internet 110 or another wide area network, interfaces with the OSA 36. The OSA 36 may be, for example, a simple server, such as, for example, a desktop computer. In a different embodiment, one or more tablet computers or other types of mobile devices (such as smartphones) can be used by the restaurant employees to communicate with the restaurant server 34. The tablet computers can communicate with the restaurant server 34 using any type communication protocols that provide connectivity with the Internet 110, such as, for example, Internet connected 802.11 (Wi-Fi), or a cellular data connection.

The OSA 36 can be coupled to a point-of-sale ("POS") server (not shown), so that the OSA 36 can post orders directly to the restaurant's POS system, as well as monitor menu changes made in the POS system. In addition, the OSA 36 can be connected to a printer, such as, for example, a thermal printer, and an I/O system, such as a display incorporating a touchscreen, or a mouse and keyboard. The thermal printer can be used, for example, to print incoming orders in kitchen and diner format, as well as allow for reprinting at the restaurant's discretion.

The driver server 108 communicates with the driver mobile device 122, which runs a driver mobile software application, over the Internet 110. Alternatively, the driver server 108 communicates with the driver mobile device 122 via the communication server 130, which is coupled to the Internet 110 and/or the cellular phone network 134. The delivery driver 118 uses the driver mobile device 122 to retrieve orders from the driver server 108 for delivery, as more fully set forth in U.S. application Ser. No. 13/622,659 and application Ser. No. 13/622,868, which are previously incorporated by reference. Furthermore, the driver mobile device 122 can send order delivery statuses to the diner device 126 over the Internet 110 or the cellular network 134. When an order is delivered, the driver 118 provides a delivered status and delivery time for the order to the driver server 108, which subsequently stores the order information into the database 104. In some cases, the delivery driver 122 does not provide the delivered status or delivery time for the order to the driver server 108.

The communication server 130 is used to communicate with the diner devices 126 and the driver devices 122. For example, the server 130 is used to send and receive Email messages, Short Message Service ("SMS") messages, push notifications, robocalls, proprietary messages, etc. The assessment server 152 accesses the database 104 to retrieve order information, and assesses or evaluates the accuracy of estimated delivery time provided by participating restaurants. The assessment result is then provided to diners for their selection of restaurants. Such result can also be used to rank or rate the restaurants. In one implementation, the assessment is targeted at one or more specific restaurants. In further implementations, the assessment focuses on different scopes of the restaurant service. For example, the assessment is performed on orders placed within a specific time period (such as 6:00-8:00 PM on Fridays). As an additional example, the assessment is performed on orders placed during certain types of weather, such as rainy or snowy weather.

For each order, the order time and the estimated delivery time are known and stored in the database 104 when the diner 116 placed the order. In one implementation, an order record is created in the database 104 when the order is placed. An illustrative structure 1000 of the order record is shown in FIG. 10. The order time or order reception time is shown at 1030, while the estimated delivery time, or delivery-by time, is shown at 1034. The record 1000 is created by the order server 102 and updated by the restaurant server 34, the driver server 108, and the communication server 130. It can also be said that the record 1000 is a database record that is created and modified by a database engine running inside the database 104. The servers 34,102,108,130 access the database 104 to create and update the record 1000.

To assess the accuracy of estimated delivery time of one or more orders, the assessment server 152 needs to know the actual delivery time of the orders. However, the order actual delivery time is usually only available for some orders, and not available for other orders. For example, when the delivery driver 118 provides the delivered status and delivery time to the driver server 108 after she delivers the order, the driver server 108 updates the order actual delivery time field 1040 in the record 1000 for the underlying order. In this case, the order's actual delivery time is known.

Figure 2:
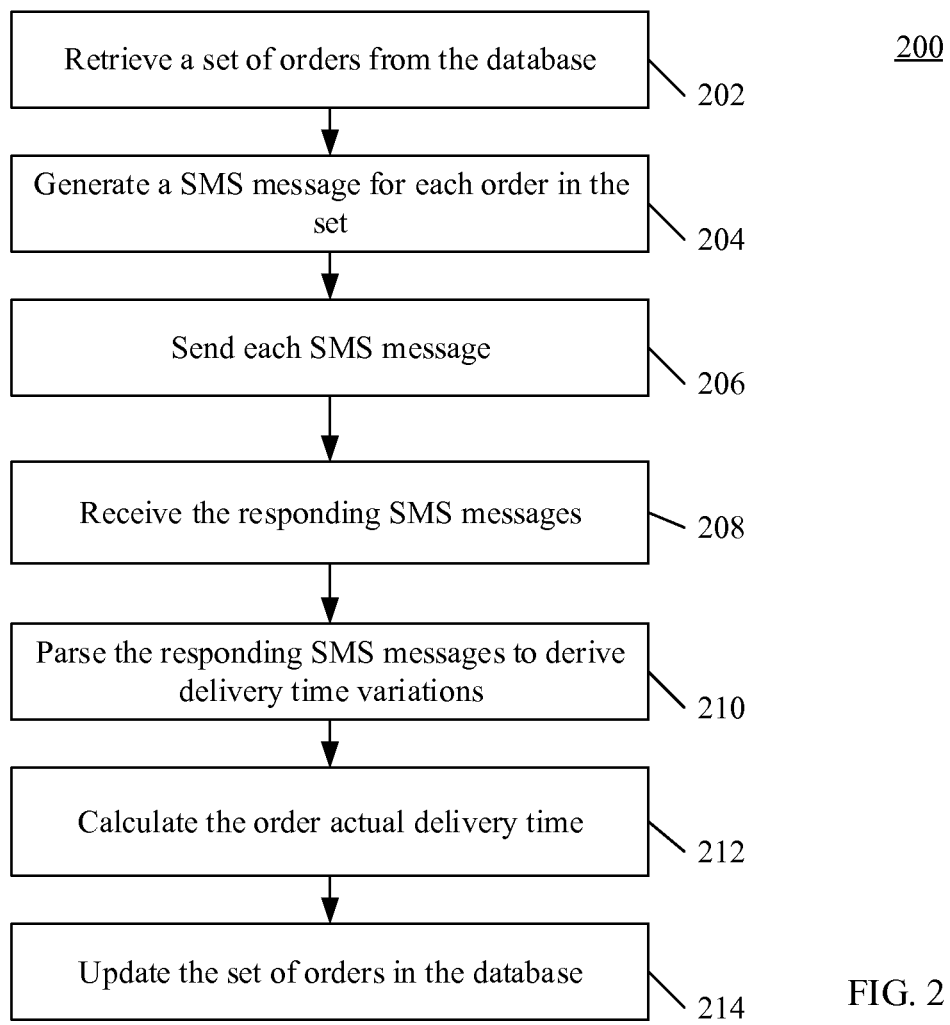
FIG. 2 is a flowchart depicting a process by which an order actual delivery time is retrieved from diner using SMS messages in accordance with the teachings of this disclosure.

Sometimes, the driver 118 may not provide the order actual delivery time after she delivers the order. Or, she may not be using a mobile device like the driver device 122 in providing her delivery service. In such cases, the order actual delivery time is not known. In one embodiment, a server software application running on the communication server 130 performs a process 200, illustrated by reference to FIG. 2, to determine the actual delivery time. Turning now to FIG. 2, at 202, the server application retrieves a set (meaning one or more) of orders from the database 104. The set of orders is selected based on a number of criteria. For example, the order actual delivery time for each order in the set has to be not available yet, and the corresponding estimated delivery time has to be, for example, twenty minutes or more before the current time. At 204, for each order in the set, the server application generates a SMS message targeted to the diner's mobile telephone number (shown at 1008 in FIG. 10). The SMS messages ask the diners whether their orders are delivered on-time, how many minutes their orders are delivered later or earlier than the estimated delivery time.

Figure 3:
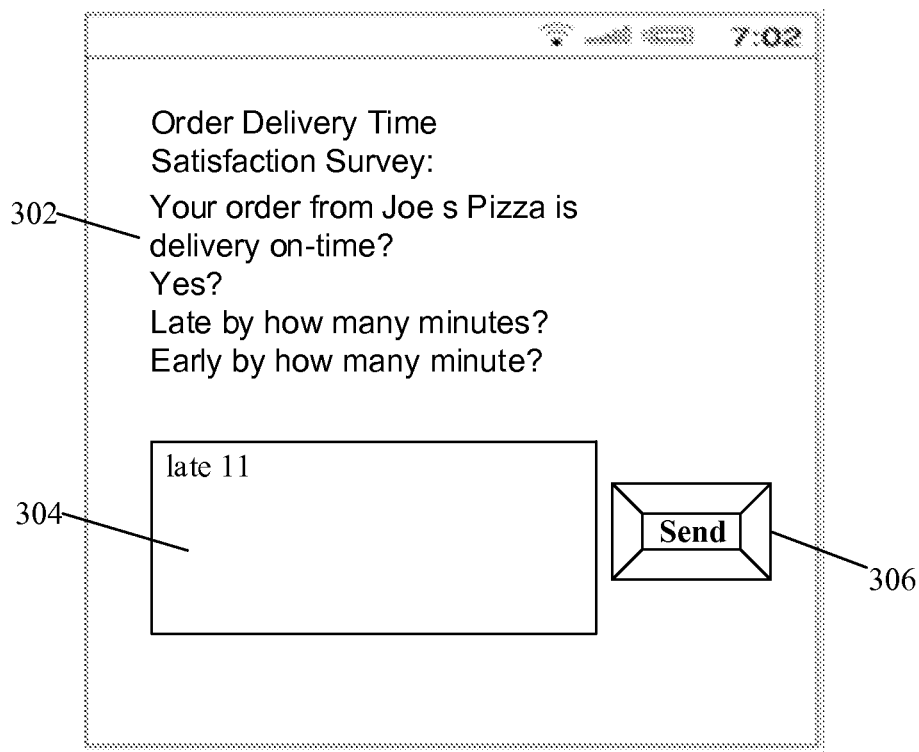
FIG. 3 is a sample screenshot of a smart mobile phone showing a SMS message requesting for food delivery time in accordance with the teachings of this disclosure.

At 206, the server application sends the SMS messages to the corresponding diner devices, such as the device 126. The diner device 126 displays the SMS message to the diner 116. The SMS message is further illustrated by reference to FIG. 3. The content of the SMS message is indicated at 302, which asks whether the diner 116 received her order on-time (meaning delivered at the estimated delivery time), or how many minutes her order was delivered late or early relative to the estimated delivery time. To respond to the SMS message, the diner 116 types, for example, "y" or "yes" in an input field 304 to indicate an on-time delivery. The diner 116 can type, for example, "late 11" to indicate that the delivery was eleven minutes late, or "early 5" to indicate that the delivery is early by five minutes.

After the diner 116 types in her answer, she presses a "Send" button 306 to send her response. Turning back to FIG. 2, at 208, the server application receives the responding SMS message from the diner 116, and other responding SMS messages from other diners. At 210, the server application parses the received responding SMS messages from the diner device 126 and other diner devices. For example, where the responding SMS message is "y" or "yes", the delivery time variation from the corresponding estimated delivery time is zero (0). Where the responding SMS message is "10 late," "l 9," or "12", the delivery time variation from the corresponding estimated delivery time is ten (10), nine (9) or twelve (12) minutes after the estimated delivery time. As an additional example, where the responding SMS message is "3 earlier" or "early by 4," the delivery time variation from the corresponding estimated delivery time is then three (3) or four (4) minutes before the estimated delivery time.

At 212, the server application calculates the order actual delivery time. For example, the order actual delivery time is same as the estimated delivery time when the delivery time variation is zero. Where the delivery is late, the order actual delivery time is the estimated delivery time plus the delivery time variation. For example, where the estimated delivery time is 6:30 PM or 25 minutes from the order time 6:05 PM, and the delivery time variation is seven minutes late, then the order actual delivery time is 6:37 PM. Similarly, the order actual delivery time is the estimated delivery time minus the delivery time variation when the delivery was earlier the estimated delivery time. For example, where the estimated delivery time is 6:30 PM or 40 minutes from the order time 5:50 PM, and the delivery time variation is six minutes earlier, then the order actual delivery time is 6:24 PM. At 214, the server application updates the set of orders in the database 104 with the calculated order actual delivery time.

Figure 4:
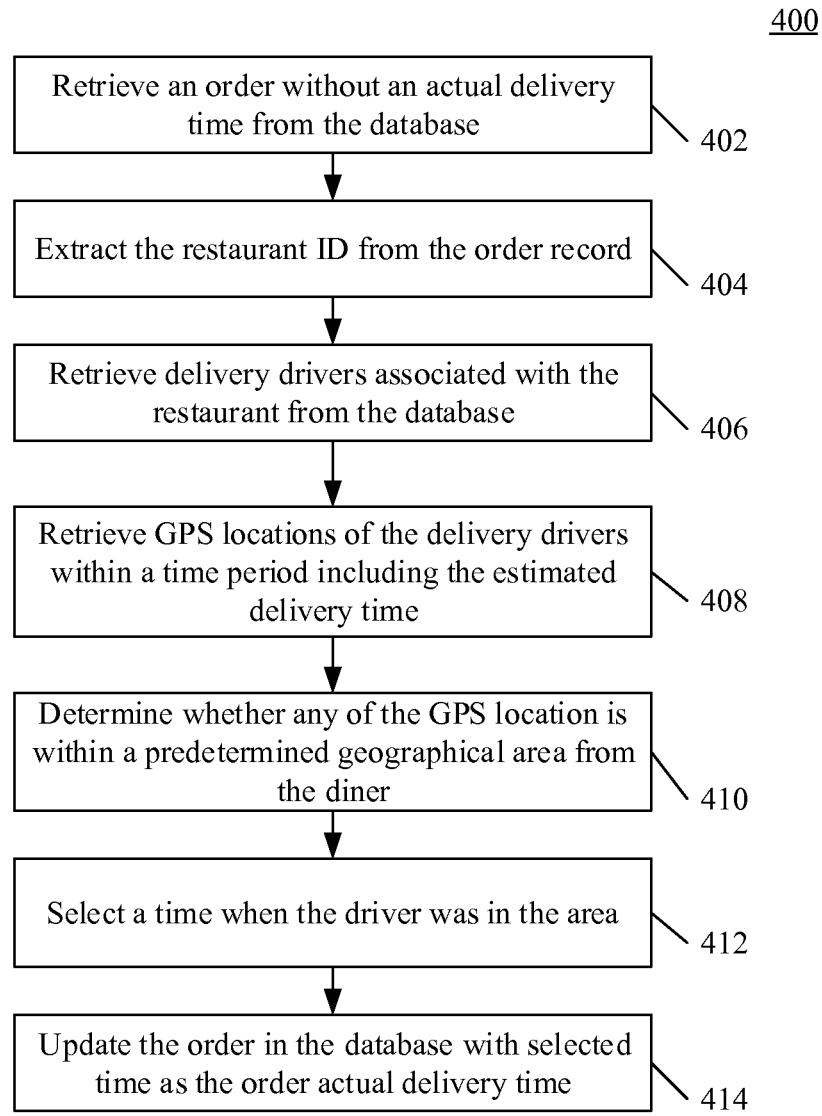
FIG. 4 is a flowchart depicting a process by which order actual delivery time is derived from GPS locations of delivery drivers in accordance with the teachings of this disclosure.

Alternatively, Email messages, instead of SMS messages are used by the process 200. However, some diners may not respond to such SMS or Email messages at all, or their responding SMS or Email messages cannot be deciphered to derive desired data. Furthermore, some diners may not have valid Email addresses or smart mobile phones. In such cases, the server application performs a different process 400, as illustrated in FIG. 4, to determine the actual delivery time of orders. Turning now to FIG. 4, at 402, the server application retrieves an order without an actual delivery time from the database 104. At 404, from the retrieved order record, the server application extracts the serving restaurant ID (1038 in FIG. 10). At 406, the server application retrieves delivery drivers, associated with the restaurant identified by the restaurant ID, from the database 104. In one implementation, the association between restaurants and delivery drivers is represented by a number of relational database records within the database 104.

At 408, the server application retrieves GPS locations of the retrieved delivery drivers around the estimated delivery time of the order. For example, where the estimated delivery time, contained in the order record retrieved at 402, is Mar. 2, 2013, 7:05 PM, GPS locations of the delivery drivers between 6:50 PM and 7:50 PM on Mar. 2, 2013 are retrieved from the database 104. In one implementation, the delivery driver devices, such as the devices 122, run a delivery driver software application. The driver software application periodically provides the GPS location of the hosting delivery driver device to the driver server 108 or the communication server 130 which subsequently stores the GPS location into the database 104. A GPS location includes a longitude, a latitude and/or time. The GPS location can also include an altitude.

At 410, the server application determines whether any of the GPS location is within a predetermined geographical area of the diner of the retrieved order. For example, the geographical area can be a city block of the diner's address (indicated at 1006 in FIG. 10). In one embodiment, the city block is defined four pairs of GPS location coordinates (longitude, latitude). Alternatively, the geographical area is expressed by a radius from the diner's address or corresponding GPS location. The geographical area is stored in the database 104. For example, the radius and diner's home address GPS location are fields of the record 1000.

Where there are one or more GPS locations of the delivery drivers that were within the predetermined geographical area, at 412, the server application selects a time when a driver was within the area. For example, where the driver 118 was in the area for five minutes, the middle point of the five minutes window is selected as the order actual delivery time. Alternatively, at 412, the server application selects the time when the driver 118 is closest to the diner's home address GPS location. At 414, the server application updates the order record with the selected time as the order actual delivery time.

Figure 5:
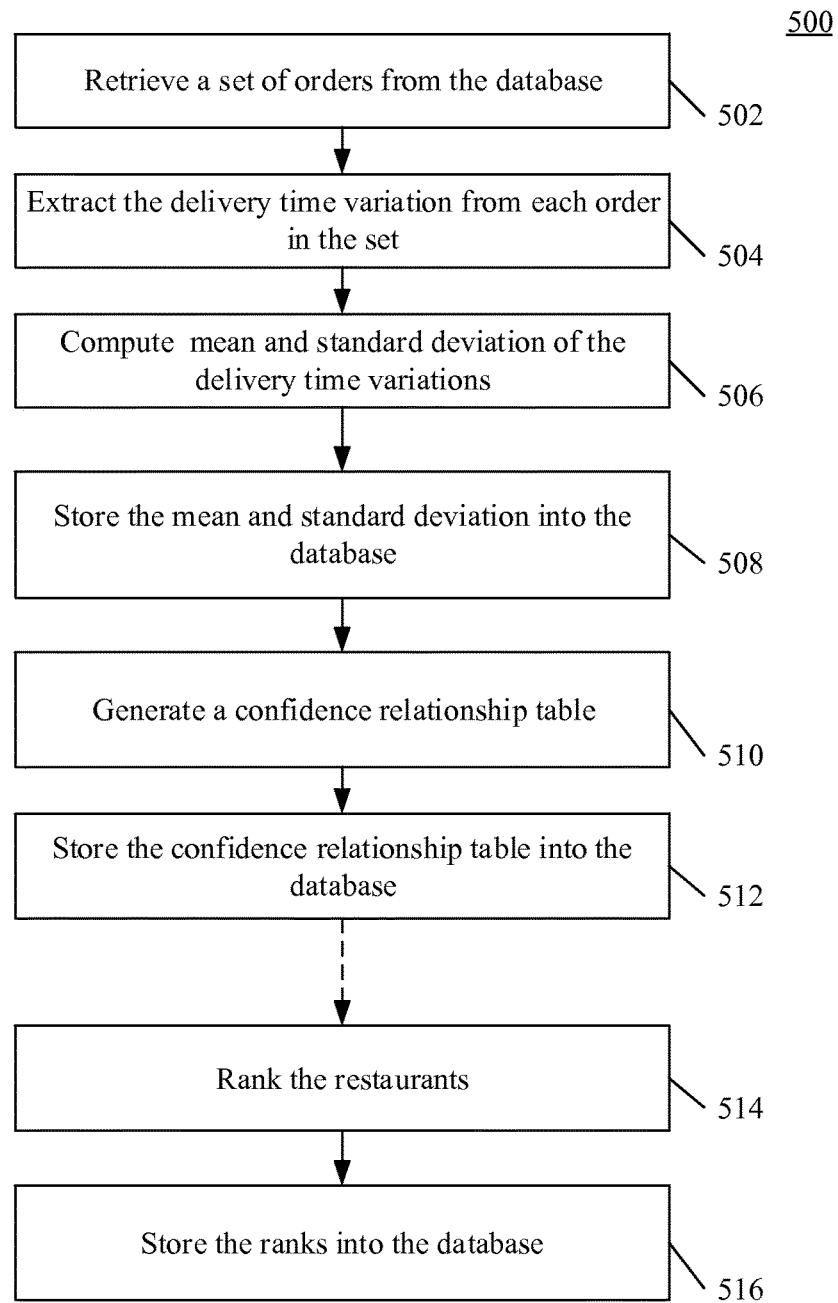
FIG. 5 is a flowchart depicting a process by which a confidence relationship table is derived in accordance with the teachings of this disclosure.

A server software application running on the assessment server 152 accesses the database 104 to retrieve and analyze orders to determine the accuracy of estimated delivery time provided by restaurants. The orders are selected depending on a specific goal. For example, one goal is to determine the accuracy for one or more specific restaurants, while another goal is to determine the accuracy for orders placed in certain time frame or weather condition for a specific restaurant. Referring now to FIG. 5, a process 500 for assessing and determining the accuracy of estimated delivery time of a set of orders is performed by the server application. At 502, the server application retrieves the set of orders from the database 104. Each order in the set includes an estimated delivery time and an order actual delivery time. At 504, the server application extracts a delivery time variation from each order record in the set.

At 506, the server application computes the mean and standard deviation of the delivery time variations. At 508, the server application stores the mean and standard deviation into the database 104. Moreover, at 508, the server application stores an association between the mean and standard deviation and the assessment target that corresponds to the retrieved set of orders. For example, the assessment target is a specific restaurant, or a specific restaurant's orders placed during certain time frame. The association can be represented as a database record in the database 104.

Figure 7:
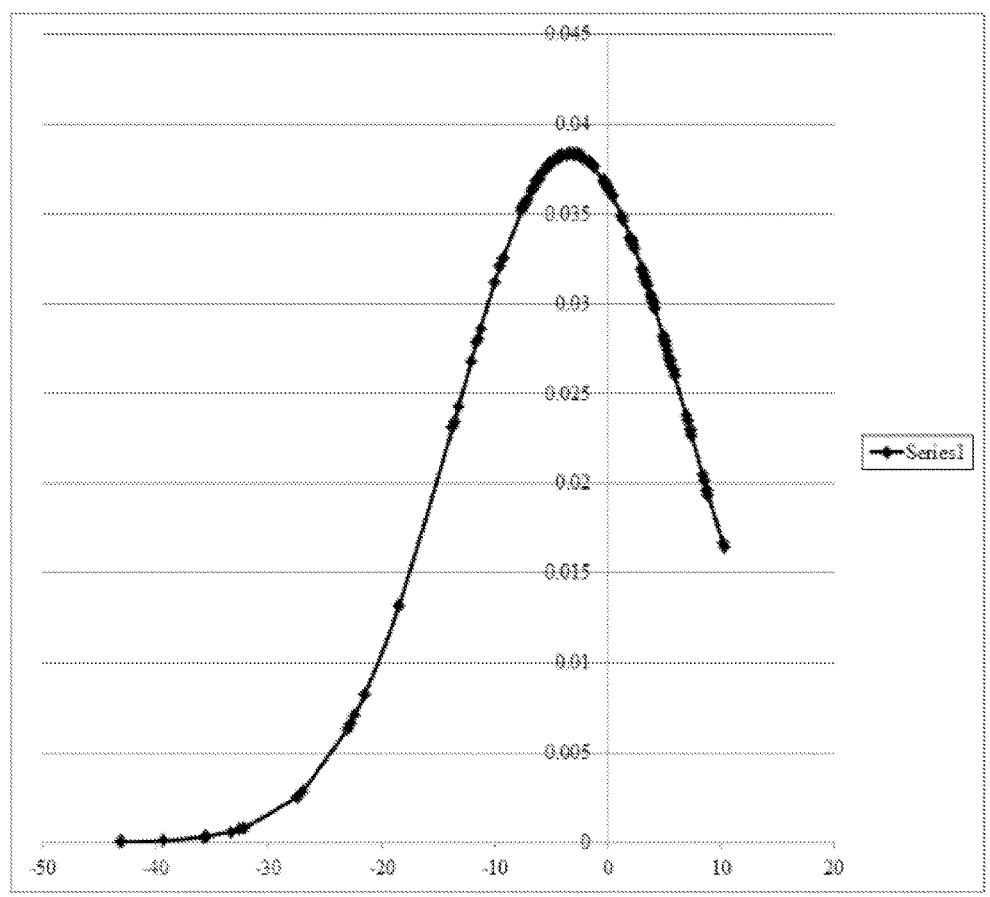
FIG. 7 is a graph depicting a probability density curve demonstrating the approximately normal distribution based on a set of data in accordance with the teachings of this disclosure.

A sample table 600 of delivery time variations is illustrated by reference to FIG. 6. The table 600 includes 170 delivery time variations for 170 orders, shown in five columns. For example the first column lists the first 35 delivery time variations. In the table 600, a negative number means the order actual delivery time is after the corresponding estimated delivery time. For example, −23 indicates that the order was delivered late by 23 minutes, while 9 indicates that the order was delivered early by 9 minutes. Obviously, 0 indicates that the order was delivered on-time or at a time that is the same as estimated delivery time. A graph depicting a probability density curve demonstrating the approximately normal distribution based on the data in the table 600 is shown in FIG. 7. Here, the given set of data includes a mean of m=−3.290441176, and a standard deviation of s=10.39881154791, whereby the horizontal axis shows the delivery time variations in minutes.

Let variable X stand for the normal random variable of the delivery time variation. By standardizing a normal distribution, $Z=(X-m)/s$, and referring to a table of cumulative probabilities for a standard normal distribution as shown in FIG. 8, a relationship between statistical confidence intervals and confidence level can be constructed. The confidence relationship is further illustrated by reference to the simplified confidence relationship table below:

| Confidence interval | Confidence interval in numerical format | Confidence level |
| --- | --- | --- |
| m ± 1.151*s | −15.25107 to 8.67859 | 75% |
| m ± 1.439*s | −18.25433 to 11.67344 | 85% |
| m ± 1.645*s | −20.39648 to 13.81560 | 90% |
| m ± 1.96*s | −23.6721 to 17.0912 | 95% |

For example, for an estimated delivery time, it can be said that the restaurant service is 95% confident that the order will be delivered no more than 23.67 minutes later and no more than 17 minutes earlier than the estimated delivery time. As an additional example, it can be said that the restaurant service is 75% confident that the order will be delivered no more than 15.26 minutes later and no more than 8.68 minutes earlier than the estimated delivery time.

Turning back to FIG. 5, at 510, the server application generates the confidence relationship table. The confidence relationship table is an accuracy measure of the accuracy of estimated delivery time of the set of orders related to one or more specific restaurants. At 512, the server application stores the confidence relationship table into the database 104. In a further implementation, at 514, the server application ranks or rates restaurants based on the confidence relationship, mean, and/or standard deviation. In other words, at 514, the server application generates a delivery time rank for restaurants. For example, a higher rank is assigned to restaurants with lower standard deviations. One example formula is: rank=ceil(s/10). As an additional example, a higher rank is assigned to restaurants with lower means. At 516, the server application stores the ranks into the database 104.

Figure 9:
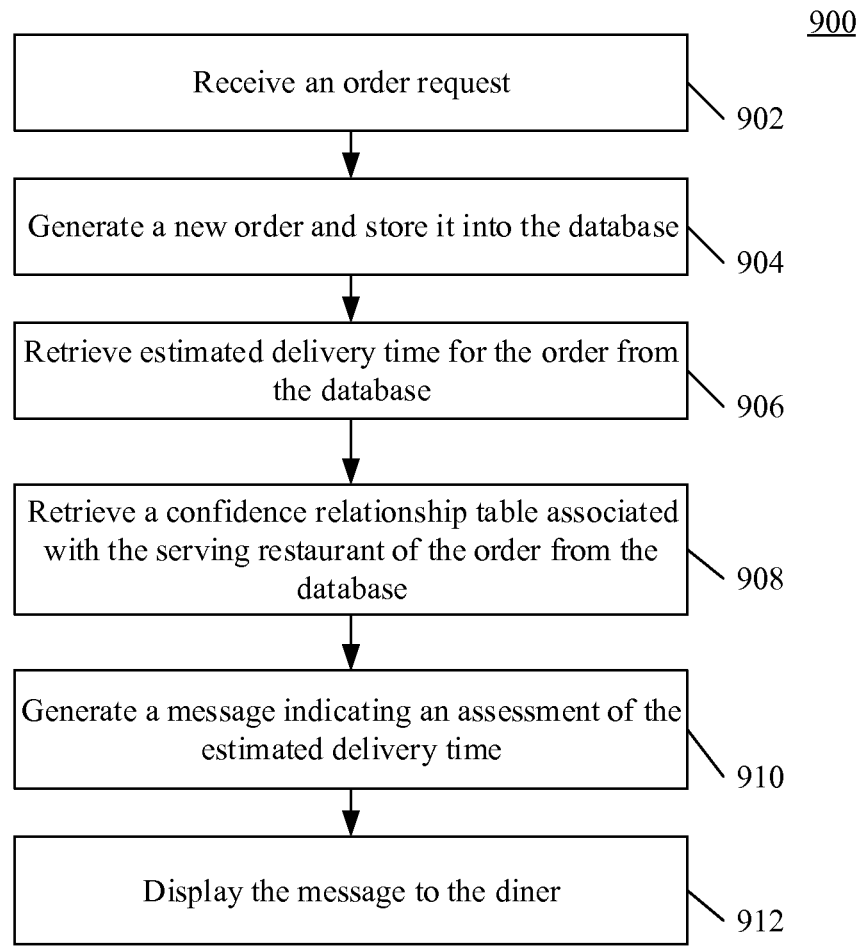
FIG. 9 is a flowchart depicting a process by which an estimated delivery time assessment message is shown in accordance with the teachings of this disclosure.

When the diner 116 searches for a restaurant for ordering food by accessing a website hosted on, for example, the order server 102, an order server software application running on the order server 102 performs a process 900, shown in FIG. 9, to provide assessment information regarding estimated delivery time of an order. At 902, the server application receives an order request from the diner device 126. At 904, the server application generates a new order and stores it into the database 104. The restaurant server 34 retrieves the order from the database 104, sends it to the OSA 36 for confirmation, receives an order confirmation along with an estimated delivery time from the OSA 36, and updates the order in the database 104 with the updated order information, such as the estimated delivery time. At 906, the server application retrieves the estimated delivery time from the database 104. Alternatively, the order server 102 and the restaurant server 34 exchange data directly over a network connection (not shown).

At 908, the server application retrieves a confidence relationship table associated with the serving restaurant of the order from the database 104. At 910, the server application generates a message indicating an assessment of the estimated delivery time. For example, the message reads "95% confident that the order will be delivered no more than 20 minutes later and no more than 17 minutes earlier than the estimated delivery time." Alternatively, the message reads "Extremely likely that the order will be delivered no more than 20 minutes later and no more than 17 minutes earlier than the estimated delivery time." As an additional example, the message reads "Very likely to be delivered within 7 minutes of the estimated delivery time." At 912, the server application displays the message to the diner 116.

In a further implementation, the estimated delivery time rank can be used as a search criterion when the diner 116 searches for a restaurant. In one implementation, the rank is an input to a database search query. Alternatively, restaurants, returned for a restaurant search, are displayed based on their estimated delivery time ranks. Restaurants with higher ranks are displayed before restaurants with lower ranks.

Obviously, many additional modifications and variations of the present disclosure are possible in light of the above teachings. Thus, it is to be understood that, within the scope of the appended claims, the disclosure may be practiced otherwise than is specifically described above. For example the database 104 can include a set of distributed physical databases that support replication. As an additional example, the functionality of the servers 34,102,108,130,152 can be performed on a single or multiple physical servers. Moreover, such servers can be deployed in a redundant and load balanced networking system architecture. As a further example, some or all the servers 34,102,108,130,152 communicate with each other over a network (not shown). For instance, where the server 34 receives an order confirmation with an estimated delivery time from the OSA 36, the server 34 stores such information into the database 104, and directly sends the stored information or a notification about the stored information to the order server 102.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. For example, while various specific dimensions were disclosed to better enable a person of skill in the art to easily reproduce the disclosed device without undue experimentation, different dimensions could be used and still fall within the coverage of the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A restaurant service system for assessing the accuracy of estimated delivery time provided by a restaurant, the system comprising:
   i) an order server including an order server software application, the order server software application adapted to collect a set of orders from a set of diner devices
   ii) a restaurant server including a restaurant server software application, the restaurant server software application adapted to send the set of orders to an on-site service appliance disposed within the restaurant, and receive an estimated delivery time for each order in the set of orders from the on-site service appliance;
   iii) a service server including a service server software application, the service server software application adapted to determine an order actual delivery time for at least one order in the set of orders;

wherein the service server is a communication server, and the service server application is further adapted to: retrieve a set of GPS locations of a set of delivery drivers from the database, wherein the set of delivery drivers are associated with the restaurant, the set of GPS locations are associated with a time period including the estimated delivery time of the at least one order, wherein the set of GPS locations is received from a set of delivery driver mobile devices corresponding to the set of delivery drivers, select a time associated with one GPS location in the set of GPS locations, and assign the selected time as the order actual delivery time for the at least one order;

(iv) an assessment server including an assessment server software application, the assessment server software application adapted to determine an accuracy measure of estimated delivery time for the restaurant based on the order actual delivery time, and store the accuracy measure into a database;

wherein the assessment server software application is further adapted to: compute a set of delivery time variations from the estimated delivery time and the order actual delivery time of each order in the set of orders, derive a set of statistical measures from the set of delivery time variations, generate an accuracy measure of estimated delivery time for the restaurant based on the set of statistical measures, and store the accuracy measure into the database;

wherein the order server software application is further adapted to receive a new order request for the restaurant from a first diner device, retrieve an estimated delivery time for the new order from the restaurant, retrieve the accuracy measure of the restaurant from the database, based on the accuracy measure, generate an estimated delivery time assessment message for the new order, and send the estimated delivery time and the estimated delivery time assessment message to the first diner device, wherein the first diner device displays the assessment message on a screen of the first diner device.

2. The system of claim 1, wherein the functions of the order server, the restaurant server, the service server and the assessment server are performed by one or more physical servers.

3. The system of claim 1, wherein the service server is a driver server, wherein the service server application receives the order actual delivery time for the at least one order in the set of orders from a delivery driver mobile device.

4. The system of claim 1, wherein the service server is a communication server, and the service server application is further adapted to:
    i) send a first message to a first diner device corresponding to the at least one order, wherein the first message requests for the order actual delivery time for the at least one order;
    ii) receive a second message from the first diner device, wherein the second message includes an indicator of the order actual delivery time;
    iii) parse the second message to extract the indicator; and
    ii) based on the indicator, determine the order actual delivery time for the at least one order.

* * * * *